June 1, 1937. W. H. SILVER 2,082,554
LISTER
Filed Dec. 12, 1932 8 Sheets-Sheet 1
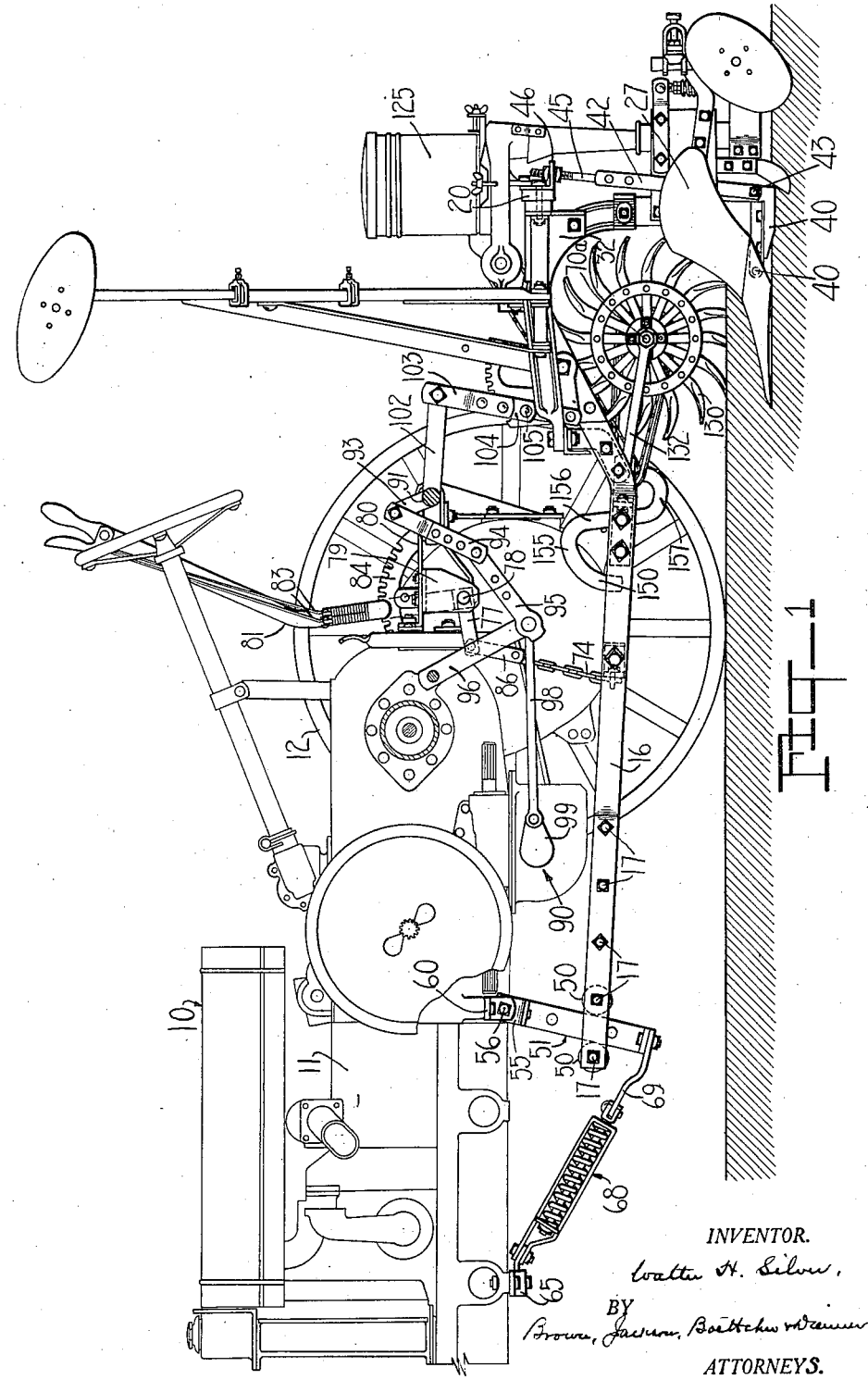
INVENTOR.
Walter H. Silver,
BY
Brown, Jackson, Boettcher & Dienner
ATTORNEYS.

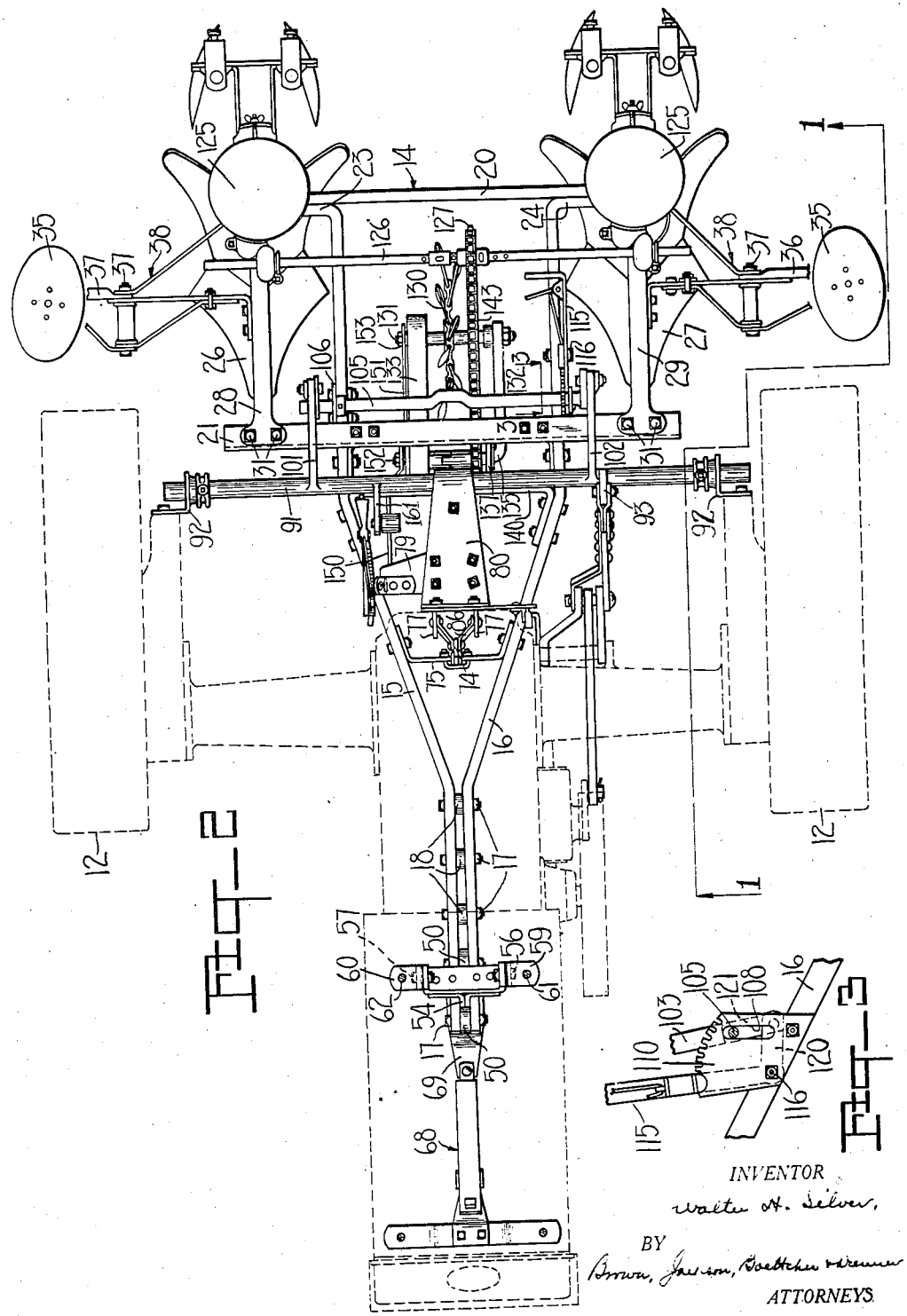

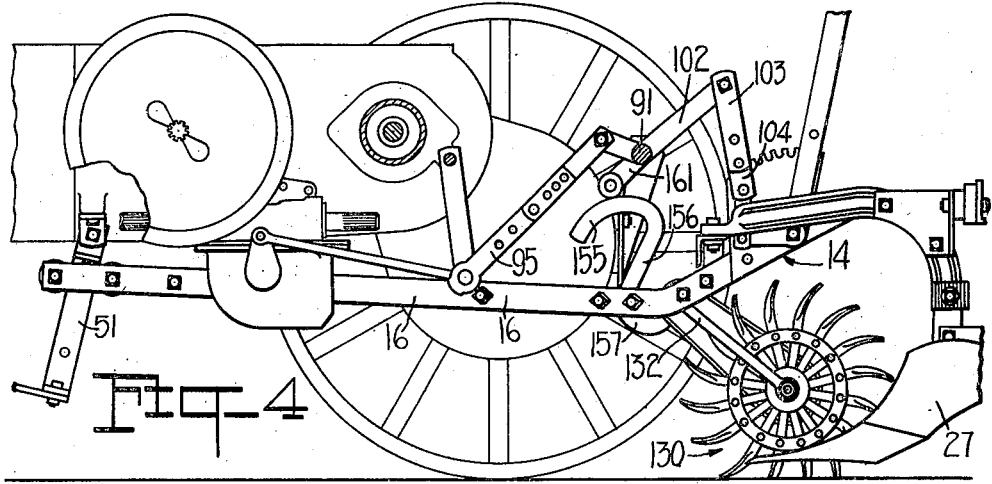
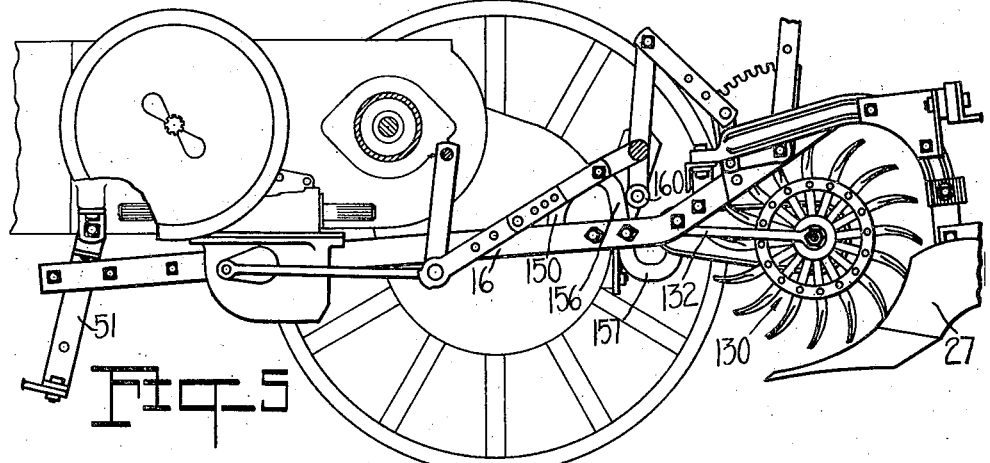
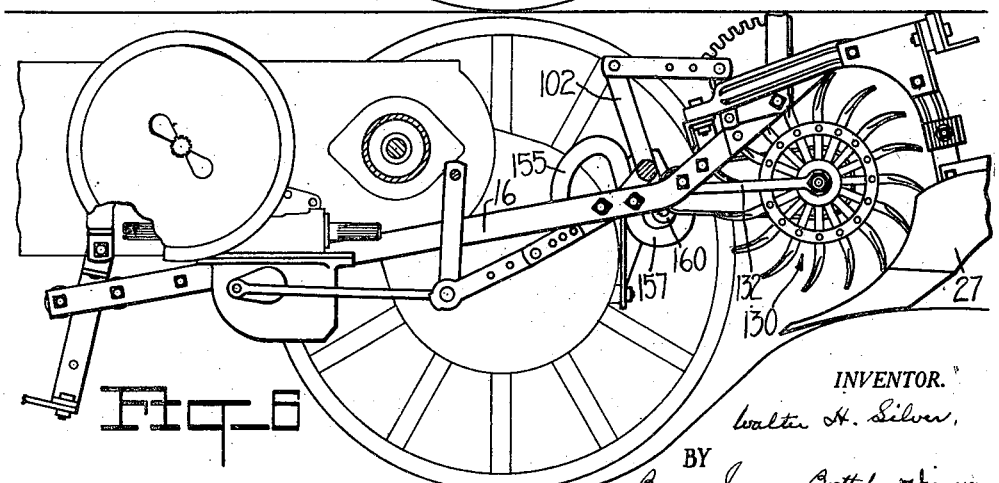

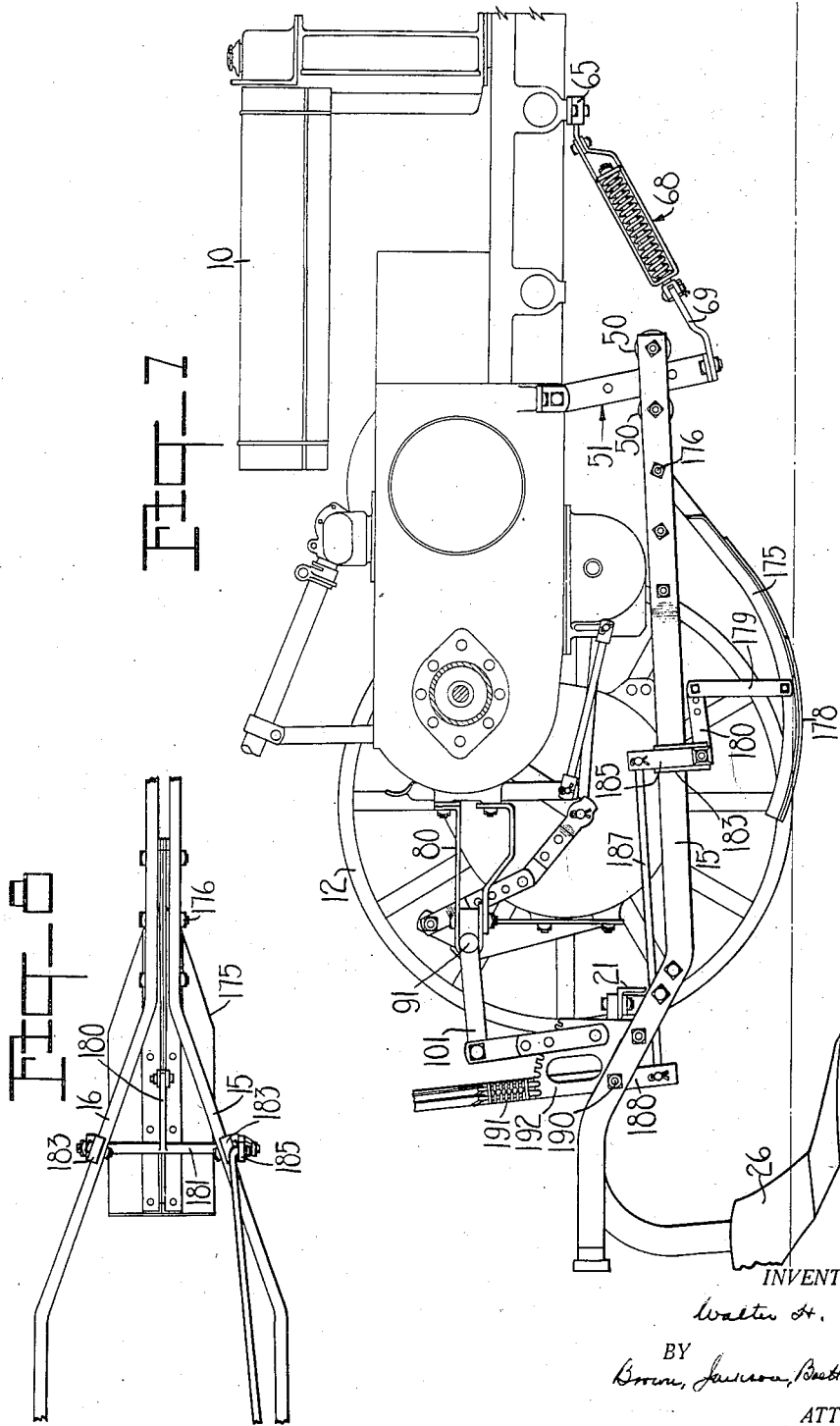

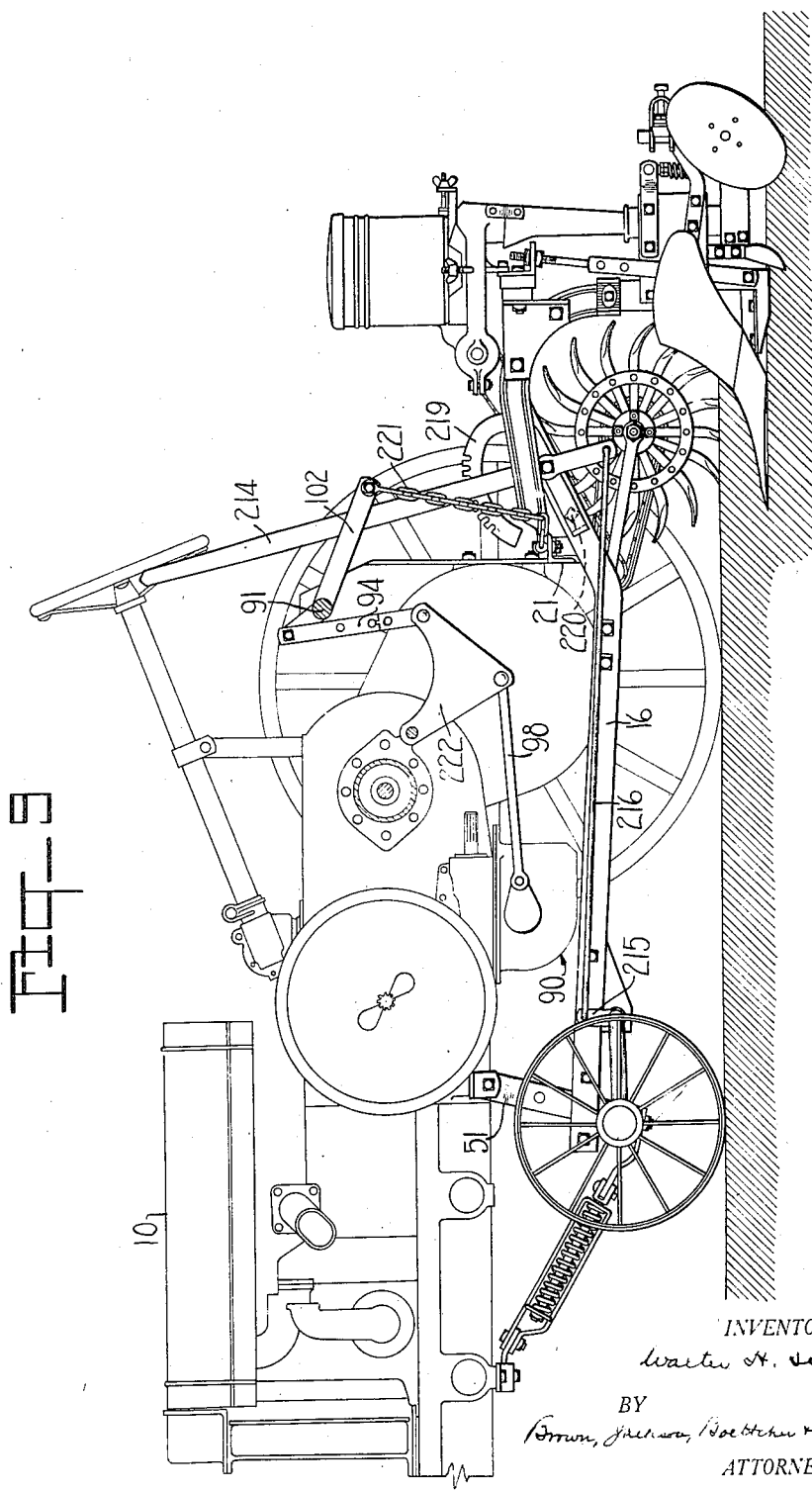

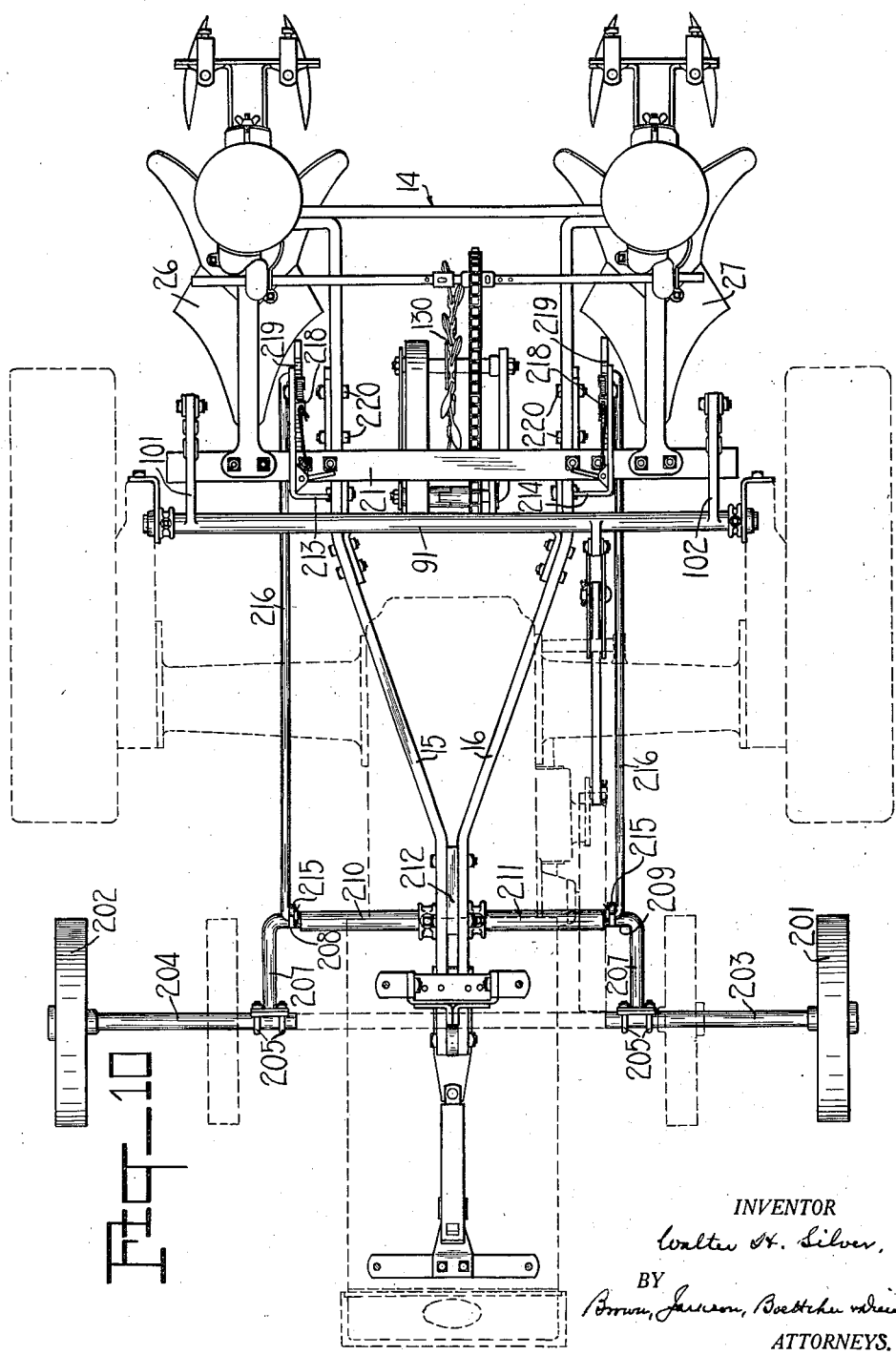

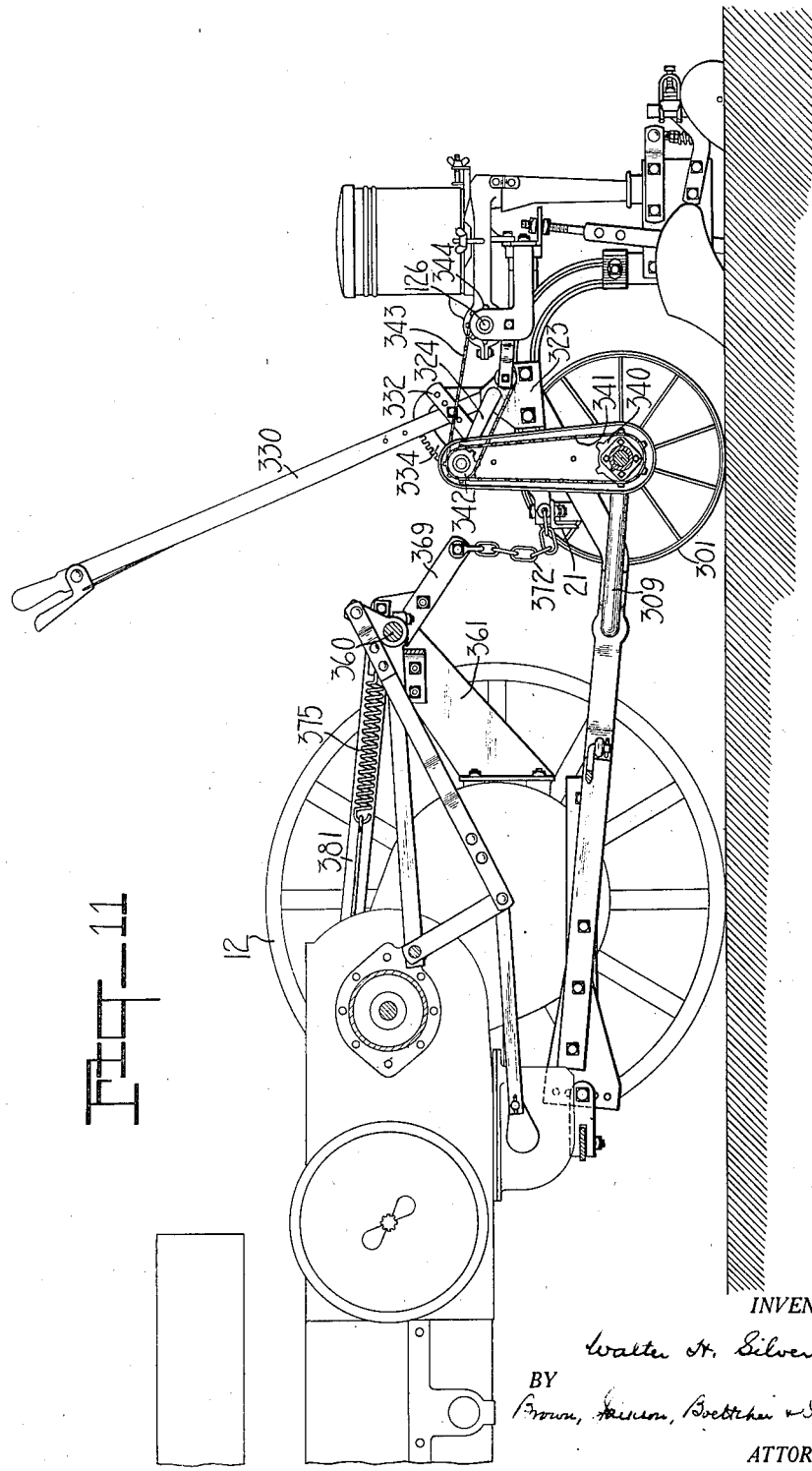

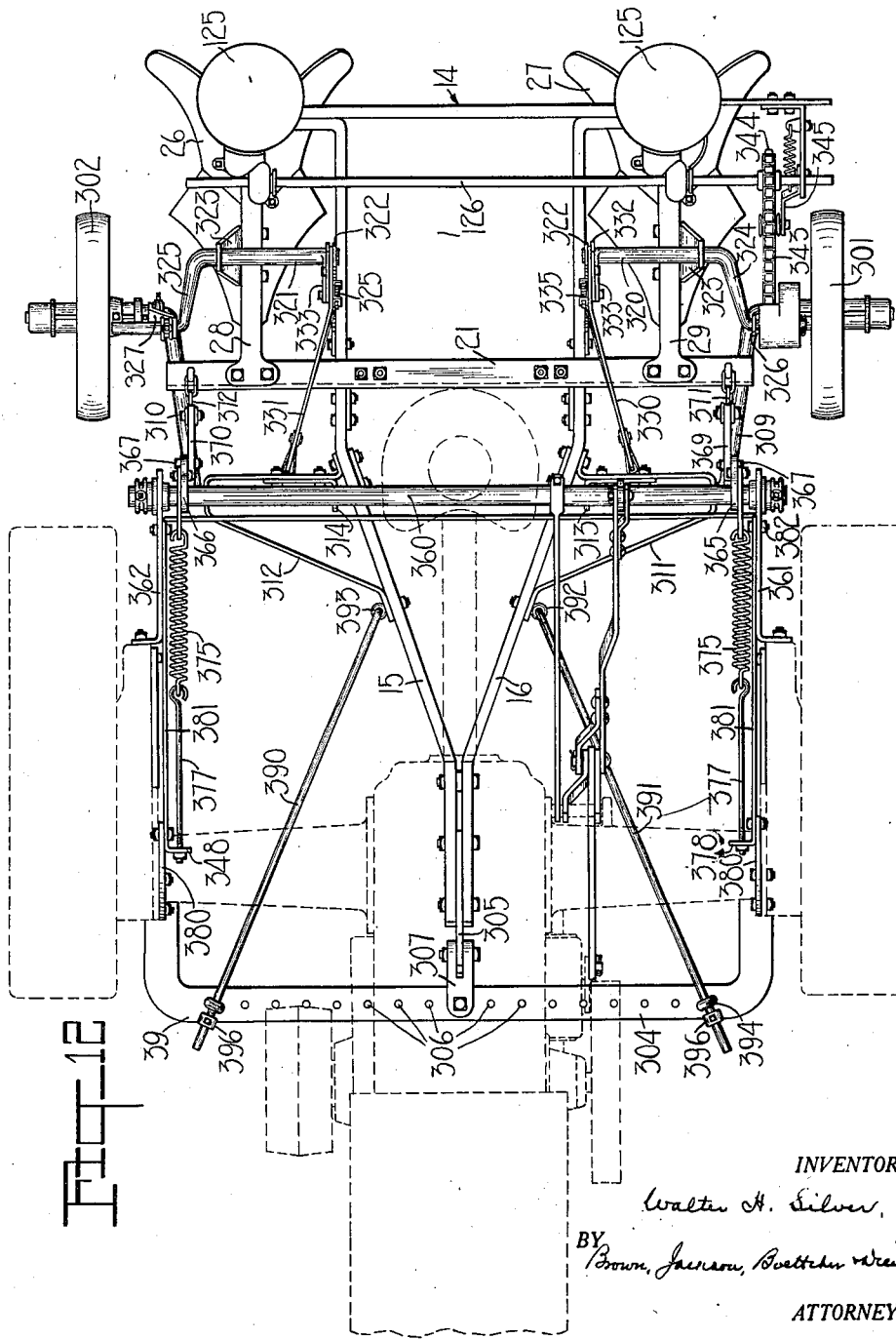

Patented June 1, 1937

2,082,554

UNITED STATES PATENT OFFICE 2,082,554

LISTER

Walter H. Silver, Moline, Ill., assignor to Deere & Company, Moline, Ill., a corporation of Illinois Application December 12, 1932, Serial No. 646,845

48 Claims. (Cl. 111—59)

The present invention relates generally to agricultural implements and is particularly concerned with the provision of a new and improved lister for opening furrows and, usually, depositing seed therein. More specifically, the present invention relates particularly to implements in the form of attachments adapted to be detachably connected with farm tractors and to be, at least in part, supported and controlled thereby. Of course, more broadly considered, the principles of the present invention are equally applicable to combined tractor-implement units or the equivalent as well as to machines where the implements are detachably associated with the tractor.

One of the principal objects of the present invention is the provision of a new and improved lister having certain novel features in connection with the means for gauging the operating depth of the furrow openers of the lister. More generically considered, the principal object of the present invention is the provision of a new and improved means for determining the operating position of the ground engaging tool means forming a part of the machine.

Another object of the present invention is the provision of new and improved means for driving the seed selecting mechanism of the lister. According to the preferred construction, the driving means is actuated from a ground engaging wheel which is driven independently of the power means on the tractor.

Still further, another object of the present invention is the provision of certain novel features in connection with the means for leveling the lister, and another object of the present invention is the provision of improved means for raising the lister frame, that is, the tool beams and the furrow openers carried thereby, to inoperative or transport position. In this connection the present invention also contemplates the provision of improved draft connections by which the forward end of the lister frame is connected with the tractor for vertical floating movement, as a result of which when the tools are lowered to operative position they more quickly penetrate the ground to the desired operating depth. In this connection, also, the present invention contemplates means for floatingly connecting the seed selecting drive means and for controlling the vertical position thereof when the lister frame is raised and lowered to and from transport position.

These and other objects of the present invention will be apparent from the following detailed description of the preferred constructions, illustrated in the accompanying drawings in which:

Figure 1 is a vertical view taken along the line 1—1 in Figure 2 with certain parts being shown in section, illustrating the present invention as embodied in a construction in which the forward portion of the lister frame is connected with the tractor for substantially vertical floating movement;

Figure 2 is a top plan view of the machine illustrated in Figure 1;

Figure 3 is a fragmentary section taken along the line 3—3 of Figure 2 and illustrating a portion of the means for leveling the implement shown in Figures 1 and 2;

Figures 4, 5, and 6 illustrate different positions of the seed selecting drive means, these positions varying according to the various positions which may be assumed by the lister frame relative to the tractor propelling the same;

Figure 7 illustrates a modified construction in which the lister frame is gauged from the ground surface by a single member disposed intermediate the ends of the tool beams or lister frame and also disposed in a vertical longitudinal plane intermediate the lister bottoms;

Figure 8 is a fragmentary plan view of the gauge means shown in Figure 7;

Figures 9 and 10 are, respectively, elevation and plan views of a construction embodying gauge wheels adjustably associated with the forward portion of the lister frame for controlling the position of the lister;

Figure 11 is a vertical elevation, certain parts being shown in section, illustrating a construction in which one of the gauge wheels is utilized as a part of the driving means for the seed selecting mechanism; and Figure 12 is a top plan view of the implement shown in Figure 11 and showing a preferred form of means for limiting the lateral movement of the lister frame relative to the tractor.

Referring now more particularly to Figures 1, 2, and 3, the reference numeral 10 indicates a farm tractor of more or less conventional construction embodying a power plant 11 and laterally spaced traction wheels 12. Secured to the tractor, either in the nature of an attachment thereto or as a more or less integral part thereof, is a lister embodying a frame structure 14 comprising a pair of generally longitudinally disposed frame members or tool beams 15 and 16 converging forwardly at their front ends and connected together in closely spaced relation by means of a plurality of bolts 17 and suitable spacers 18. At their rear ends the frame members 15 and 16 are rigidly connected together by transversely disposed members 20 and 21, the rearmost portions 23 and 24 of the frame members 15 and 16 being turned laterally outwardly and secured to the transverse member 20 in any manner desired.

The lister includes a pair of laterally spaced soil engaging tools in the nature of furrow openers 26 and 27 which are fixed to the lower ends of stub beams 28 and 29, the latter being connected with the transverse member 20 and with the forward transverse member 21, as by bolts 31. Preferably, the stub beams 28 and 29 are connected with the rear portion of the lister frame by means of plates or brackets 32. The stub beams 28 and 29 are each provided with a marker 35 carried by an arm 36 pivotally connected, as at 37, with a bracket 38 extending outwardly from the associated stub beam.

For causing each of the furrow openers 26 and 27 to operate at a given depth for each position at which the lister frame may be held with respect to the tractor, each of the furrow openers is provided with a shoe 40 pivotally connected, as at 41, with the frog of the furrow opener. A link 42 is pivotally connected, as at 43, with the shoe 40 and is provided at its upper end with a threaded shank 75 which extends through an opening formed in a bracket 46 fixed to the rear face of the transverse member 20. The threaded shank 45 is provided with a nut one on each side of the bracket 46 by which the link 42 is held in a fixed position of adjustment. The shoe 40 rides in the bottom of the furrow and causes the furrow opener to operate at a given depth for each position at which the tool frame 14 is held with respect to the tractor 10.

The forward draft is transmitted from the tractor 10 to the lister by means of a yielding draft connection which is so arranged as to provide for relative vertical floating movement of the forward end of the lister with respect to the tractor. As mentioned above, the forwardmost portions of the frame members 15 and 16 converge forwardly and at their forward ends the members 15 and 16 carry a pair of longitudinally spaced rollers 50 mounted on certain of the bolts 17. A draft arm 51 is pivotally connected with the tractor and comprises two flat members 53 and 54 bolted together in juxtaposition with the upper ends thereof bent laterally in opposite directions and bolted to a U-shaped member 55 having its ends turned upwardly and pivotally supported on pivot bolts 56 and 57 to angle brackets 59 and 60 which are fixed to the under side of the tractor 10 by means of bolts 61 and 62. As best shown in Figure 1, the draft arm 51 is disposed between the rollers 50 and the forwardmost ends of the frame members 15 and 16.

The draft arm 51 is disposed substantially vertically and is capable of pivotal swinging movement about an axis defined by the bolts 56 and 57, the forwardmost ends of the frame members or tool beams being adapted to be capable of shifting vertically while in draft transmitting relation with the draft arm 51. For yieldingly restraining the arm 51 and for transmitting draft directly to the lower end thereof, a bracket 65 is secured to the under side of the tractor by bolts or the equivalent. Preferably the bracket 65 is secured adjacent the front end of the tractor. A spring cushioning device 68 is connected at its forward end with the bracket 65 and at its rear end with a link 69, the latter being bolted to the lower end of the draft arm 51. By virtue of this construction, the draft arm 51 is normally held in a position similar to that shown in Figure 1 in which the arm is substantially perpendicular to the line of draft extending from the forward end of the frame members 15 and 16 to the center of the resistance of the tools. The forward ends of the beams 15 and 16 will therefore have little or no tendency to move up or down along the arm 51 during normal operation. The draft arm may swing rearwardly about its pivot axis 56 under an abnormal load by the yielding of the spring means included in the cushioning device 68.

The position of the tool beams 15 and 16, or the forward end of the lister frame 14, relative to the vertically disposed draft arm 51 is controlled by means which reacts against the tractor 10 and is connected with the lister frame intermediate the ends of the beams 15 and 16. This means includes a flexible element, such as a chain 74 or the like, which has its lower end connected with a brace 75 connected between the beams 15 and 16 adjacent the mid section thereof. The upper end of the chain 74 is connected with a pair of arms 77 fixed to a transversely disposed rock shaft 78 journaled in bearing openings provided in a bracket 79 bolted to the under side of a rearwardly extending bracket or brace member 80. A lever 81 is fixed to one end of the rock shaft 78 and is provided with a pair of latches 83 which cooperate with a notched sector 84 to lock the rock shaft 78 in any one of a plurality of adjusted positions. The sector 84 is fixedly secured to the bracket 79 in any desired manner, and the upper end of the chain 74 is connected with the arms 77 through links 86 or the equivalent, as best shown in Figure 1.

It is important to note that the connection of the depth adjusting lever 81 and associated parts with the tool beams 15 and 16 is effected at a point substantially midway between the front and rear ends thereof. By virtue of this connection the tool beams, that is to say, the lister frame, is connected for substantially rocking movement about an axis which is disposed midway between the front and rear ends of the lister frame, this movement not effecting the draft transmitting relation between the front ends of the members 15 and 16 and the draft arm 51 since the members are capable of vertical floating movement by virtue of the rollers 50-50 and the vertical disposition of the draft arm 51. While the operating depth of the furrow openers 26 and 27 can be controlled by means of the adjusting lever 81, the up and down movements of the tractor 10 have only a relatively small effect upon the lister. If, for example, the rear wheels 12 of the tractor should begin to mire down, the lowering of the rear end of the tractor merely slackens the chain 74 but does not force the lister bottoms to cut deeper, as would be the case if the lister frame were fixedly connected with the tractor. In fact, the lowering of the rear end of the tractor has the effect of changing the angularity of the draft arm 51 with respect to the vertical so that the increased angularity of the draft arm 51 creates a tendency for the front ends of the tool beams 15 and 16 to move upwardly along the draft arm 51, which results in the lister cutting shallower and thereby lightening the load on the tractor.

The above described construction is also important in that the rate at which the lister bottoms enter the ground to their full depth when they are lowered from transport to operative position is substantially increased; that is, when the furrow openers 26 and 27 are lowered to begin the listing operation, the lister bottoms enter the ground to their full depth within a very short amount of forward travel without any special manipulation of the adjusting lever 81. To start plowing, it is merely necessary to adjust the lever 81 to the position corresponding to the depth at which it is desired to operate, then the lister frame can be lowered from transport position. When this is done, the points of the lister bottoms 26 and 27 will first pierce the surface of the soil. The draft reaction will cause the beams 15 and 16 to rock forwardly, that is, in a counterclockwise direction as viewed in Figure 1, about the point at which the chain 74 is attached to the tool beams. This causes the bottoms 26 and 27 to be pitched downwardly to the maximum amount, thereby causing quick penetration of the bottoms. As they approach the depth to which the lever 81 is set and the chain 74 is tightened, the beams 15 and 16 are rocked rearwardly, that is, clockwise as viewed in Figure 1, until the bottoms assume a level position, as determined by the adjustment of the shoe 40.

In effect, therefore, the action of the tool beams 15 and 16 is, for all practical purposes, the same as would be obtained if the depth adjusting lever 81 were connected to the forward ends of the tool beams 15 and 16 and after dropping the lister to operative position, were first thrown to its extreme forward position to permit the front ends of the beams to rock to the lower end of the draft arm 51 and after the bottoms 26 and 27 have penetrated to the desired depth, and then the lever 81 shifted rearwardly to a position corresponding to the depth at which the bottoms were to be operated. By connecting the depth adjusting lever 81 through a chain 74 at a point intermediate the ends of the two beams 15 and 16, thereby permitting the forward ends of the beams to have a floating connection with the draft arm 51, this extra manipulation of the depth adjusting lever to obtain quick penetration is unnecessary, the connection of the tool beams, as described above, securing the desired quick penetration automatically.

Reference was made above to the operation of raising and lowering the tool beams 15 and 16 to and from transport or inoperative position. This is preferably accomplished through a connection with the power lift 90 of the tractor. For this purpose a rock shaft 91 is journaled for rocking movement in brackets 92 secured to the chain housings of the tractor and in a bearing block carried at the rear of the bracket 80 (see Figure 7). The rock shaft 91 is provided with an arm 93 to which is connected a link 94. The latter is pivotally connected with another link 95 which is supported at its forward end from a pendulum link 96 pivotally carried on the tractor, as best shown in Figure 1. The forward end of the link 95 is connected by means of a pull rod 98 with the crank arm 99 of the power lift 90 of the tractor. The power lift 90 is of more or less conventional construction and is controlled by means of a pedal.

The rock shaft 91 is also provided with a pair of rearwardly extending arms 101 and 102, the rear ends of which are connected by links 103 with arms 104 mounted on a transversely disposed bail member 105. The latter is journaled in a bearing bracket 106 fixed to the right hand frame member 15 and extends through a vertically disposed slot 108 (see Figure 3) in a sector 110 fixed to the left hand frame member 16.

The position of the left hand end of the bail member 105 in the slot 108 is controlled by means of a leveling lever 115 which is pivoted, as at 116, to the side of the frame member. The leveling lever includes a forwardly extending arm portion 120 preferably formed integral therewith, and the forward end of the arm portion is connected by means of a link 121 with the bail member 105. By virtue of this construction the left hand portion of the lister frame may be raised or lowered by swinging the leveling lever 115 in the proper direction, thereby leveling the lister relative to the tractor. Also, the lister is free to move vertically with respect to the tractor, by virtue of the links 103 pivotally connecting the arms 102 on the rock shaft 91 with the arms 104 on the bail member 105, but the lister is, however, held against swinging or tipping laterally.

The lister includes seed selecting mechanism supported on the lister frame 14. The seed selecting mechanism includes a seed can 125 carried by the frame 14 above each of the furrow openers 26 and 27. The seed selecting mechanism also includes a drive shaft 126 journaled on the frame 14 and provided with a sprocket 127 by which the shaft may be driven. Power for operating the seed selecting drive shaft 126 is derived from a drive wheel 130 journaled on a bolt 131 disposed between an arm 132 and a chain housing 133. The arm 132 has a laterally bent portion 135 at its forward end by which the arm 131 is journaled in brackets 137 extending rearwardly and fixed to a brace member 140 disposed between the frame members 15 and 16. The forward end of the chain housing 133 is supported on the end of the bent portion 135, as best indicated in Figure 2. The drive wheel 130 is connected by means of sprocket and chain connection housed in the chain housing 133 with a sleeve 141 which is, in turn, connected by means of a chain and sprocket connection 143 with the sprocket 127 on the drive shaft 126.

By virtue of the pivotal arrangement provided for by the arm 132 and the chain housing 133, the drive wheel 130 is free to float vertically so that power will be delivered to the seed selecting drive shaft 126, irrespective of whether the wheel 130 is operated in a trench or on top of a ridge.

When the lister is raised to inoperative or transport position, as by the actuation of the power lift 90, it is desirable to prevent the drive wheel 130 from dropping down to a position below that of the lister bottoms 26 and 27. In order to hold the drive wheel 130 in such postion, an S-shaped arm 150 is provided and which has a rearward extension 151 connected to the end portion 135 of the arm 132 by means of a nut 152 and to the bolt 131 by means of a nut 153. The S-shaped arm 150 serves as a cam having a dwell portion 155, a vertically disposed portion 156, and a curved or reentrant portion 157.

When the lister is lifted through the actuation of the power lift 90, the drive wheel 130 remains on the ground until the bent or cam portion 155 strikes a roller 160 carried at the end of an arm 161 fixed to the rock shaft 91. This is the position indicated in Figure 4. With the continued raising movement of the lister, the upward movement of the lister frame 14 and the downward swinging of the arm 161 carrying the roller 160 causes the drive wheel 130 to be rocked upwardly until the roller 160 rides over the crest of the dwell portion 155 and begins to enter the vertical portion 156 of the arm 150, as indicated in Figure 5, this figure showing the lister frame in its normally completely elevated position. In this position the drive wheel 130 is held above the lower edge of the lister bottoms.

Occasionally it is necessary to cross deep gullies with the tractor, and in such cases the lister bottoms may strike against the ground so as to push the lister upwardly relative to the tractor beyond its normally elevated position as shown in Figure 5. In this case it is not desirable that the drive wheel 130 should be raised any further, relative to either the tractor or the lister frame, because if the drive wheel 130 is elevated to too great an extent it may strike the tractor seat. In order to prevent the drive wheel from being rocked upwardly and striking the tractor seat (not shown), the reentrant portion 157 of the arm 150 is provided with a downward bend to accommodate the upward movement of the arm 150 as a whole relative to the roller 160 so as to prevent the latter from serving to swing the drive wheel 30 any higher. Thus, as shown in Figure 6, when the lister is raised relative to the tractor beyond its normally lifted position, the arm 61 with its roller 160 moves rearwardly, inasmuch as the rock shaft 91 is rocked by the upward thrust on the links 103. This movement of the roller 160 not only prevents the wheel 130 from being rocked upwardly relatively to the lister frame beyond its normal full lifted position but may, if desired, be arranged to actually lower the drive wheel 130 relative to the tractor. This latter function is, of course, not essential.

In the construction illustrated in Figures 1 to 6, inclusive, the structure including the depth adjusting lever 81 for controlling the operating depth of the soil engaging tools is carried by and gauges the tools from the tractor. Under some conditions it may be preferable to gauge the operating depth of the furrow openers 26 and 27, not by means carried by the tractor, but by means operating in connection with the surface of the ground. To this end, the construction illustrated in Figures 7 and 8 embodies a shoe 175 pivotally connected with the lister frame bars 15 and 16, as at 176, the shoe 175 being in the form of a curved member having a ground engaging portion 178 which is disposed substantially midway between the ends of the frame beams 15 and 16. The position of the shoe 175 relative to the lister frame is controlled through a connection comprising a link 179 pivotally connected to the shoe and to the end of an arm 180 fixed to the center of a rock shaft 181 which is journaled in the lower ends of a pair of brackets 183 depending from the sides of the frame members 15 and 16. At one end the rock shaft is provided with an arm 185 fixed thereto, the upper end of the arm being pivotally connected to a link 187 which extends rear ardly and which is, in turn, connected to the lower end of a depth adjusting lever 188 pivotally connected, as at 190, to one of the lister beams 15 and 16. The depth adjusting lever 188 includes the usual detent mechanism 191 operating in conjunction with a sector 192 fixed in any manner desired to the lister beam 15.

In view of the fact that the ground contacting portion 178 of the shoe 175 is disposed substantially midway between the ends of the beams 15 and 16 and is also disposed in a vertical longitudinal plane passing substantially midway between the furrow openers 26 and 27, the operation of the construction shown in Figures 7 and 8 is similar to the construction shown in Figures 1 and 2 as regards the vertical floating movement of the front end of the lister beams. The depth at which the lister operates is, however, entirely independent of the tractor, since the depth adjusting means comprises a member which is in contact with the ground surface and is not, as is the depth adjusting lever 81 shown in Figures 1 and 2, supported on the tractor. In the construction shown in Figures 7 and 8, the tractor may rise or sink but the lister will not be effected since the position of the lister beams 15 and 16 relative to the ground is gauged entirely through the shoe 175 which slides along the ground surface. Moreover, it is to be observed that the shoe 175 serves a purpose similar to the chain 74 in Figure 1 in providing an intermediate axis about which the lister frame has rocking movement so that the front ends of the lister beams are floatingly connected with the substantially vertically disposed draft arm 51.

The form of the invention illustrated in Figures 1 and 2 contemplates the provision of depth adjusting means on the tractor for determining the operating position of the furrow openers, whereas the form of the invention shown in Figures 7 and 8 just described contemplates the provision of gauge means operating on the surface of the ground. In both of the forms described above, however, the lister frame is leveled by adjustable means associated with the lifting connections. In the form of the invention shown in Figures 9 and 10 and now about to be described, both the gauging and the leveling operations are performed by ground engaging means. Leveling from the surface of the ground has certain advantages, as compared with leveling from the tractor. For example, whenever the tractor tilts due to irregularities in the ground surface, the lister is also constrained to tilt to the same extent. However, where the lister is leveled from the ground surface, the tractor is capable of tilting laterally without affecting the position of the lister. In the structure illustrated in Figures 9 and 10, the leveling of the lister, as well as the operating depth of the soil engaging tools, is controlled entirely by two laterally spaced wheels 201 and 202. These wheels are journaled on the ends of axles 203 and 204 which are adjustably fixed by means of U-bolts 205 to the ends of arms 207 which are formed integral with shafts 208 and 209, respectively, the latter shafts being journaled in sleeve members 210 and 211 fixed rigidly to and extending laterally outwardly from a plate 212 bolted between the front ends of the lister beams 15 and 16. In effect, therefore, the axles 203 and 204 and the associated shafts 208 and 209 form crank axles adjustably connected with the lister frame and capable of rocking movement to raise or lower the gauge wheels 201 and 202 with respect thereto.

The shafts 208 and 209 may be individually rocked through connections with depth adjusting levers 213 and 214, respectively, these connections comprising an arm 215 fixed to each shaft and a link 216 pivotally connected therewith and extending rearwardly and connected with the lower end of the associated depth adjusting lever. These levers are equipped with latches 218 which cooperate with sectors 219 fixed to the sides of the lister beams 15 and 16 by means of bolts 220.

Through the adjustment of the levers 213 and 214 the front ends of the lister beams 15 and 16 may be adjusted to any vertical position, thereby adjusting the operating depth of the lister bottoms 26 and 27. By adjusting one of the levers independently of the other, the lateral tilt of the lister frame 14 may be adjusted. Since in this form the lister is leveled by the independent adjustment of the levers 213 and 214, the lifting connections in this form are somewhat simplified as compared with the lifting connections shown in, for example, Figures 1 and 2. In this form the lister frame is directly connected with the arms 101 and 102 of the rock shaft 91 by flexible connections, such as the chains 221. It is possible to utilize a triangular swingably mounted plate 222 instead of the pendulum link 96 and the link member 95 shown in Figure 1.

The wheels 201 and 202 may be adjusted to any lateral position by merely loosening the U-bolts 205 and shifting the axles 203 and 204 to the desired position. The extreme inner position is shown in Figure 10 in dotted lines, and when the wheels 201 and 202 have been adjusted to positions approaching that indicated in Figure 10 by the dotted lines the tractor may be driven forwardly away from the lister after the latter has been disconnected therefrom, the traction wheels 12 clearing the gauge wheels 201 and 202. Normally, however, in operation these gauge wheels are generally positioned forward of the traction wheels, as indicated in full lines in Figure 10. It is to be noted that in the modification shown in Figures 9 and 10, as in the construction shown in Figures 7 and 8, the depth at which the lister operates is controlled entirely independently of the tractor by ground engaging means, the lister having, however, floating engagement with the draft arm 51 which is secured underneath the tractor 10.

Figures 11 and 12 illustrate the form of lister which, like the construction shown in Figures 1 and 2, includes means for holding the lister against lateral tilting and also means serving as a ground engaging wheel for driving the seed selecting mechanism. The lister shown in Figures 11 and 12 is also, like the constructions described above, adapted to be raised and lowered by means connected with the power lift of the tractor and to be adjusted for depth of operation by manually controlled lever means.

Referring now more particularly to Figures 11 and 12, the lister frame 14 is connected at its forward end with a U-shaped draw bar 304 of conventional construction carried by the tractor, the lister connection being effected by means of a plate 305 bolted between the lister beams 15 and 16 and which is, in turn, connected to any one of a series of holes 306 in the draw bar by means of a clevis 307. Preferably, as illustrated in Figure 12, the U-shaped draw bar 304 is disposed in a forward position, rather than in a conventional rearward position, whenever the lister is attached thereto.

The lister in this form of construction includes a pair of gauge wheels 301 and 302 which are journaled on the ends of crank axles 309 and 310, the latter being journaled in brackets 311 and 312 bolted to the sides of the lister beams 15 and 16 and in brackets 313 and 314 fixed to the brackets 311 and 312.

The position of the wheels 301 and 302 with respect to the lister frame is controlled by means of a pair of rock shafts 320 and 321 journaled in brackets 322 and 323 fixed, respectively, to the sides of beams 15 and 16 and 28 and 29. The rock shafts 320 and 321 have crank portions 324 and 325 formed integrally therewith and which are connected by means of links 326 and 327 with the crank portions of the gauge wheel axles 309 and 310, respectively. The position of each of the rock shafts 320 and 321 is controlled by adjusting levers 330 and 331 which are journaled on the inner ends of the shafts inside of the brackets 322. These adjusting levers are connected by means of links 332 with the ends of arms 333 formed integral with the shafts 320 and 321. The brackets 322 are each provided with a sector portion 334 formed integrally therewith and which is adapted to cooperate with a latch 335 on the adjusting levers.

The drive shaft 126 for the seed selecting mechanism 125 is driven through a chain connection with the gauge wheel 301. This connection includes a sprocket 340 fixed to the hub of the gauge wheel 301 over which is trained a chain 341, as best shown in Figure 11. A double sprocket 342 is journaled on the crank end of the rock shaft 320, the driving chain 341 being trained over one set of sprocket teeth thereof while another chain 343 is trained over the other set of teeth thereof and over a sprocket 344 fixed on the seed selecting drive shaft 126. To accommodate the change in distance between the axis of the drive shaft 126 and the axis of the crank portion of the shaft 320 on which the double socket 342 is journaled, the driving chain 343 must be run with some slack, and to take up this slack a spring tension chain tightener 345 is provided, the slack in the chain 343 and the position of the chain tightener 345 varying as the rock shaft 320 is adjusted to different positions. By virtue of this construction it will be seen that the wheel 301 serves a dual purpose, acting not only as a gauge wheel but also as a drive wheel for operating the seed selecting mechanism.

The lister shown in Figures 11 and 12 is raised and lowered through connections with a rock shaft 360 which is somewhat different in its construction and its support from the rock shaft 91 shown in Figures 1 and 2. Due to the fact that the lister shown in Figures 11 and 12 is disposed somewhat rearwardly as compared with the lister shown in Figures 1 and 2, the rock shaft 360 is journaled for rocking movement upon brackets 361 and 362 which are extended rearwardly and which are bolted to the chain housings of the tractor, whereby the rock shaft 360 is disposed at a point rearwardly of the position of the rock shaft 91 shown in Figure 2. The rock shaft 360 is provided with arms 365 and 366 secured thereto and preferably, although not necessarily, formed integral therewith, and to these arms are pivotally connected, as at 367, a second pair of arms 369 and 370, the latter being connected by chains 371 and 372 with the transverse frame member 21. The portions of the arms 369 and 370 forward of the pivots 367 are formed to lie underneath the rock shaft 360 and to abut against the lower portion thereof whereby rotation of the rock shaft 360 in a counterclockwise direction as viewed in Figure 11 will cause the arms 369 and 370 to be swung in the same direction, thus lifting the lister to transport position by means of the interconnected chains 371 and 372. This operation is assisted by spring means 375 connected by suitable links to the arms 365 and 366 and anchored to the chain housings by adjustable rods 377, the latter being secured to brackets 378 bolted to plates 380 secured to the forward portions of the chain housings. The brackets 378 have portions 381 extended rearwardly and bolted, as at 382, to the brackets 361 and 362 for reenforcing the latter and for rigidly holding the rock shaft 361 in position relative to the tractor.

For the purpose of providing the lister with a certain amount of lateral flexibility with respect to the tractor and yet prevent the lister from swinging into contact with the traction wheels 12 of the tractor, a pair of links 390 and 391 (see Figure 12) has been provided and which are connected to eyes 392 and 393 fixed to the sides of the lister beams 15 and 16. The forward ends of the links 390 and 391 pass through a second pair of eyes 394 and 395 positioned in or near the end holes of the draw bar 304. Adjustable collars 396 are provided on the ends of the links 390 and 391 for limiting the lateral swinging movement of the lister with respect to the tractor. A greater or lesser amount of permissible lateral movement of the lister may be provided for by positioning the collars 396 at the proper points on the links 390 and 391.

As in the construction illustrated in Figures 9 and 10, the lister shown in Figures 11 and 12 may be leveled by the independent adjustment of the gauge wheels 301 and 302, these gauge wheels being adjusted, as explained above, by the adjusting levers 330 and 331. It is important to note that in this construction not only can the levers 330 and 331 be adjusted for gauging the operating depth of the furrow openers 26 and 27 but, also the gauge wheels 301 and 302 may be used for raising the furrow openers out of contact with the ground by swinging the levers 330 and 331 forwardly, thereby causing the forward ends of the cranks 320 and 321 to react against the crank axles 309 and 310 to raise the lister out of the ground. It therefore follows that, if desired, the power lift means, including the shaft 360 and the arms 369 and 370, may be dispensed with if desired and both the lifting and leveling functions performed by the simultaneous or independent adjustment of the levers 330 and 331.

While I have shown and described above the various constructions in which the principles of the present invention may be embodied, it will be apparent to those skilled in the art that my invention is not to be limited to the specific details shown and described but that, in fact, widely different means may be employed in the practice of the broader aspects of my invention.

What I claim, therefore, and desire to secure by Letters Patent is:

1. In an agricultural implement, a supporting frame, a generally longitudinally extending tool beam, a draft connection connecting the forward end of said beam with said frame for substantially vertical floating movement with respect thereto, a soil engaging tool carried at the rear end of said tool beam, and raising and lowering means operatively connected with said beam intermediate the ends thereof.

2. In an agricultural implement, a supporting frame, a generally longitudinally extending tool beam associated with the frame, means connecting the forward end of said tool beam with said supporting frame for relative vertical floating movement, a furrow opener carried adjacent the rear end of said tool beam, and depth adjusting means connected with said tool beam substantially adjacent the mid-portion thereof, whereby when the tool beam is lowered and the point of said furrow opener initially engages the ground the tool beam will be caused to swing about said depth adjusting means to lower the front end of said tool beam whereby the latter is disposed in a downwardly and forwardly inclined position to increase the rate at which the furrow opener enters the ground.

3. In an agricultural implement, a supporting frame, a tool beam having a soil engaging tool carried adjacent the rear end thereof, a generally vertically disposed draft arm pivotally connected with said frame at one end, resilient means connecting the other end of said arm with said frame, means connecting the forward end of said tool beam with said draft arm for vertical shifting movement with respect thereto, and depth adjusting means carried by said frame and including a rock shaft journaled thereon, arm means carried by said rock shaft, and a flexible connection between said last named arm and said tool beam.

4. In an agricultural implement, a supporting frame, a tool beam having a soil engaging tool carried adjacent the rear end thereof, a generally vertically disposed draft arm pivotally connected with said frame at one end, resilient means connecting the other end of said arm with said frame, means connecting the forward end of said tool beam with said draft arm for vertical shifting movement with respect thereto, and depth adjusting means carried by said frame and including a rock shaft journaled thereon, arm means carried by said rock shaft, and means connected with said last named arm and pivotally connected with said tool beams substantially midway between the ends thereof, whereby the rocking of said rock shaft serves to adjust the operating depth of said tool.

5. In an agricultural implement, a wheeled supporting frame, a pair of tool beams having forwardly converging ends pivotally connected with the supporting frame at a substantially central point for limited lateral swinging movement in draft transmitting relation, seeding mechanism carried by said beams, drive means for said mechanism including a ground engaging drive wheel, means for raising said drive wheel relative to the tool beams, and means for raising both said tool beams and said drive wheel relative to said supporting frame and accommodating said limited lateral movement when the tool beams are lowered.

6. In an agricultural implement, a wheeled supporting frame, a lister frame pivotally connected with said supporting frame, seed selecting mechanism carried by said lister frame and including a drive shaft journaled thereon, means for driving said drive shaft comprising a drive wheel, an arm pivotally connected with the lister frame and supporting said drive wheel for relative vertical floating movement, and drive transmitting means connecting said drive wheel with said seed selecting shaft, means carried by the supporting frame and operatively connected with said lister frame for raising and lowering the latter relative to said supporting frame, and means including a pair of cooperating members one connected with said arm and the other carried by said supporting frame for swinging said drive wheel vertically with respect to the lister frame when the latter is shifted vertically with respect to said supporting frame by said raising and lowering means.

7. In an agricultural implement, a wheeled supporting frame, a lister frame pivotally connected with said supporting frame for relative vertical movement, seed selecting mechanism carried by said lister frame, a drive shaft therefor, means for driving said shaft including a vertically floating drive wheel, means carried by said supporting frame for raising and lowering the lister frame with respect thereto, means for raising said floating drive wheel relative to the lister frame when the latter is raised to its normal elevated position, and means rendering said last named means ineffective for raising the floating drive wheel when the lister frame has been raised beyond its normally elevated position.

8. In an agricultural implement, a wheeled supporting frame, a lister frame connected therewith for relative vertical movement, seed selecting mechanism carried by said lister frame, means for driving said mechanism including a vertically floating drive wheel, an arm pivotally connecting said floating drive wheel with the lister frame for vertical movement with respect thereto, a rock shaft carried by said wheeled supporting frame and operatively connected with the lister frame to raise the latter, a cam member carried by the drive wheel arm, means carried by said rock shaft and cooperating with said cam member for raising the drive wheel relative to the lister frame when the latter is raised by the rocking of said rock shaft relative to the supporting frame, said cam member being formed to provide for vertical movement of the lister frame beyond its normal elevated position without raising the drive wheel with respect to the lister frame.

9. In an agricultural implement, a supporting frame, a tool frame connected therewith for vertical movement with respect thereto, ground engaging tool means carried by said frame, a rock shaft journaled on said supporting frame and having arms swingable therewith, means connecting said arms with laterally spaced portions of said tool frame, and means for adjusting the connection between one of said arms and one portion of said tool frame for leveling the latter.

10. In an agricultural implement, a supporting frame, a generally longitudinally extending tool beam, draft means connecting the forward end of said beam with said frame for substantially vertical floating movement with respect thereto in draft transmitting relation, a soil engaging tool carried at the rear end of said beam, and depth adjusting means connected with the beam substantially midway between the ends thereof and reacting against said supporting frame for adjusting the operating position of said tool.

11. In an agricultural implement, a supporting frame, a tool beam extending substantially longitudinally thereof, draft means connecting the forward end of said tool beam with said supporting frame and comprising a draft member with which the front end of said tool beam is shiftably connected for vertical floating movement, a soil engaging tool carried at the rear end of said tool beam, and ground engaging means connected with the forward end of said tool beam for gauging the vertical position of the tool beam from the ground surface.

12. In an agricultural implement, the combination of a tractor having rear traction wheels, a lister adapted to be connected therewith and including a pair of generally longitudinally disposed frame members, soil engaging tools associated with the rear ends of said members, the forward ends of said members converging forwardly, draft means connecting the forwardly converged ends of said frame members with the tractor in draft transmitting relation, said means comprising a substantially vertically disposed draft member with which the forward ends of said frame members are shiftably connected for vertical floating movement with respect to the tractor, transversely disposed sleeve means rigidly connected with the forward end of said frame members, a pair of crank axles carried by said sleeve means, one crank axle being disposed at each side of the tractor, a gauge wheel journaled on each of said crank axles, said gauge wheels being positioned ahead of the traction wheels of the tractor and adjustable transversely of the tractor to dispose the gauge wheels closer together than said traction wheels, whereby the traction wheels may pass over said gauge wheels, and means for individually swinging each of said crank axles for controlling the vertical position of said frame members with respect to the ground.

13. In an agricultural implement, a supporting frame, a tool beam associated therewith and extending substantially longitudinally thereof, draft means connecting the forward end of said beam with said supporting frame, a crank axle journaled on said beam and having a gauge wheel mounted on the crank portion thereof, a soil engaging tool carried by said beam, a second crank axle journaled on said beam and having its crank portion link connected with the crank portion of said gauge wheel crank axle, and means mounted on said beam and connected with said second crank axle for raising and lowering said tool beam with respect to said gauge wheel.

14. In an agricultural implement, a supporting frame having supporting wheels, a tool frame associated therewith and provided with soil engaging tool means, draft means connecting the forward end of said tool frame with said supporting frame for swinging movement in a substantially vertical plane, a crank axle journaled on said tool frame and having a crank portion extending rearwardly, a ground engaging gauge wheel journaled on said crank portion for determining the operating position of the tool means carried by said tool frame, a shaft journaled on said tool frame and having a forwardly disposed arm portion positioned substantially above the crank portion of said gauge wheel crank axle, link means connecting the arm portion of said shaft with the crank portion of said crank axle, and means connected with said shaft for swinging the gauge wheel crank axle to vary the operating depth of said tool beams.

15. In an agricultural implement, a wheeled supporting frame, a lister frame associated therewith and comprising a pair of generally longitudinally disposed laterally spaced frame members connected together adjacent their forward ends, laterally spaced soil engaging tools carried by said lister frame, draft means connecting the forward ends of said frame members with said supporting frame, a pair of crank axles, one disposed at each side of the lister frame and each including a substantially rearwardly extending crank portion, a gauge wheel mounted on each of said crank portions and disposed substantially rearwardly of the rear wheels of said supporting frame, a pair of shafts journaled on said lister frame and each having an arm portion extending forwardly to a point substantially vertically above the axis of said gauge wheels, links connecting the arm portions of said shafts with the crank portions of said gauge wheel crank axles, means for individually rocking each of said shafts for adjusting the vertical position of said lister frame with respect to the ground surface, seed selecting mechanism carried by said lister frame and including a drive shaft, and means for driving said shaft from one of said gauge wheels and including a sprocket driven by one gauge wheel, a second sprocket mounted on said shaft, a double sprocket mounted on the crank portion of the associated upper crank axle, and sprocket chains connecting said double sprocket with the sprockets mounted, respectively, on said one gauge wheel and said drive shaft for transmitting drive from said gauge wheel to the latter.

16. In an agricultural implement, in combination, a tractor having a draw bar with ends connected with the tractor and an intermediate portion disposed forwardly of said ends, a lister frame comprising a pair of generally longitudinally disposed frame members converging forwardly at their front ends and provided with laterally spaced soil engaging tool means at their rear ends, means connecting the forward ends of said members with the intermediate portion of said draw bar in draft transmitting relation and for lateral swinging movement relative thereto, a pair of links, and means respectively connecting the front and rear ends of the latter with said draw bar and said frame members for limiting the lateral movement of the lister frame with respect to the tractor, one of the connecting means for each link establishing a pivot and the other connecting means being arranged for limited generally longitudinal displacement.

17. In an agricultural implement, in combination, a tractor having a draw bar having ends connected with the tractor and an intermediate portion disposed forwardly of said ends, a lister frame comprising a pair of generally longitudinally disposed frame members converging forwardly at their front ends and provided with laterally spaced soil engaging tool means at their rear ends, means connecting the forward ends of said members with the intermediate portion of said draw bar in draft transmitting relation and for lateral swinging movement relative thereto, and means comprising a pair of link members pivotally connected at their rear ends respectively with said frame members and connected at their forward ends for limited generally longitudinal displacement with the intermediate portion of said draw bar adjacent the ends thereof for limiting the lateral movement of the lister frame with respect to the tractor.

18. In an agricultural implement, a wheeled supporting frame having rear wheels, a tool frame associated therewith and comprising a pair of generally longitudinally extending frame members having their forward ends disposed in converging relationship and their rear ends spaced apart, a transverse frame bar connected with said frame members and extending laterally outwardly thereof, a pair of stub beams connected at their forward ends with said transverse frame bar laterally outwardly of said longitudinal frame members, and a rear transverse member connected with said stub beams and said longitudinal frame members adjacent the rear ends of the latter, U-shaped draw bar means supported by said wheeled supporting frame with its intermediate portion disposed forwardly and its ends connected with said supporting frame alongside said wheels, the forward converging ends of said longitudinal frame members being pivotally connected with said intermediate portion of the draw bar, and means providing a limited amount of lateral swinging of said tool frame, said means comprising connections disposed in the space between said wheels and extending from the converging portions of said longitudinal frame members to said draw bar means at points laterally of the point of pivotal connection of said longitudinal frame members therewith.

19. In an agricultural implement, a wheeled supporting frame, a tool frame associated therewith and comprising a pair of generally longitudinally extending members and a transversely disposed frame bar, a pair of stub beams disposed alongside said longitudinal members and connected at their forward ends with said transverse frame bar, draft means connecting the forward ends of said longitudinal members with said wheeled supporting frame, and lifting means carried by said wheeled supporting frame and connected with said longitudinal frame members adjacent to but rearwardly of said transverse frame bar for raising and lowering said tool frame.

20. An agricultural implement comprising a wheeled supporting frame, a tool frame associated therewith and including a pair of generally longitudinally extending members and a transverse member connected therewith and extending laterally outwardly thereof, a pair of stub beams having their forward ends secured to the laterally outer portions of said transverse member, soil engaging tools on said beams, said stub beams being disposed laterally outwardly of the rear portions of said longitudinal members, laterally outwardly directed bracket means carried by each of said longitudinal members forward of said transverse member, a crank axle journaled in each of said bracket means and including a crank portion extending rearwardly to a point adjacent the soil engaging tool of the associated stub beam, a gauge wheel mounted on said crank axle, and means supported on said stub beams and the adjacent rear portions of said longitudinal members for adjusting the position of said crank axles.

21. An agricultural implement comprising a wheeled supporting frame, a tool frame associated therewith and including a pair of generally longitudinally extending members and a transverse member connected therewith and extending laterally outwardly thereof, a pair of stub beams having their forward ends secured to the laterally outer portions of said transverse member, said stub beams being disposed laterally outwardly of the rear portions of said longitudinal members, laterally outwardly directed bracket means carried by each of said longitudinal members forward of said transverse member, a crank axle journaled in each of said bracket means and including a crank portion extending rearwardly to a point adjacent the associated stub beam, a gauge wheel mounted on said crank axle, a second transverse member connecting the rear portions of said longitudinally extending members and the rear portions of said stub beams, and means supported on both the stub beams and said longitudinal members for adjusting the position of said crank axles.

22. In an agricultural implement, a supporting frame, a tool beam associated therewith and extending substantially longitudinally thereof, draft means connecting the forward end of said beam with said supporting frame, a crank axle journaled on said beam and having a gauge wheel mounted on the crank portion thereof, a soil engaging tool carried by said beam, a member journaled on said beam and having a crank portion link connected with the crank portion of said gauge wheel crank axle, and means mounted on said beam and connected with said member for raising and lowering said tool beam with respect to said gauge wheel.

23. In an agricultural implement, a supporting frame, a pair of generally longitudinally extending tool beams connected therewith, seed selecting mechanism carried by said tool beams, a separate gauge wheel for each of said beams, a separate crank axle mounted on each of said beams and each having a rearwardly extending crank portion on which the associated gauge wheel is mounted, means for adjusting the height of the beams with respect to the gauge wheels and comprising a member connected to the crank portion of each crank axle for shifting the latter, and means for driving said seed selecting mechanism including a chain driven from one of said gauge wheels and sprocket means movable with said last mentioned member.

24. An agricultural implement comprising a wheeled supporting frame, a pair of tool beams associated therewith and connected thereto at the forward ends thereof, a gauge wheel associated with each tool beam, a crank axle on each beam to receive the gauge wheel associated therewith, each of said crank axles having a rearwardly extending crank, an adjusting lever for each of said tool beams, each lever having an arm fixed with respect thereto and link connected to the crank portion of the associated crank axle, seed selecting mechanism carried by said tool beams, and means for driving said seed selecting mechanism from one of said gauge wheels, said means including a transverse seed selecting shaft having a sprocket thereon, a double sprocket carried by said lever arm, a chain connecting said double sprocket and the sprocket on said seed selecting shaft, and a second chain connecting said double sprocket with said one gauge wheel.

25. In an agricultural implement, a supporting frame, a pair of generally longitudinally extending tool beams connected therewith, ground engaging tool means carried by said tool beams adjacent the rear thereof, a separate gauge wheel for each of said beams, a separate crank axle mounted on each of said beams and each having a rearwardly extending crank portion on which the associated gauge wheel is mounted in a position adjacent the associated tool means, and means for adjusting the height of the beams with respect to the gauge wheels comprising a member connected to the crank portion of each crank axle for shifting the latter.

26. In an agricultural implement, a wheeled supporting frame, a tool frame associated therewith and comprising a pair of generally longitudinally extending members having their front ends converging forwardly and their rear portions disposed in substantially parallel relation, a transverse beam connected with said members adjacent the forward ends of said parallel portions, stub beams disposed alongside said parallel portions and connected at their forward ends with said transverse member, ground engaging tools carried by said stub beams, a separate gauge wheel for each tool, a separate crank axle for each gauge wheel having a rearwardly extending crank portion on which the associated gauge wheel is mounted in a position adjacent the associated tool, and means carried by each stub beam and connected with the crank portion of the associated crank axle for raising and lowering the tools.

27. In an agricultural implement, a wheeled supporting frame, a tool frame associated therewith and comprising a pair of generally longitudinally extending members having their front ends converging forwardly and their rear portions disposed in substantially parallel relation, a transverse beam connected with said members adjacent the forward ends of said parallel portions, stub beams disposed alongside and laterally outward of said parallel portions and connected at their forward ends with said transverse member, ground engaging tools carried by said stub beams, a separate gauge wheel for each tool, a separate crank axle for each gauge wheel and having a rearwardly extending crank portion disposed adjacent but laterally outwardly of the associated stub beams, and means carried by each stub beam and the associated longitudinally extending frame member and connected with the crank portion of the associated crank axle for raising and lowering the tools.

28. An agricultural implement comprising a wheeled supporting frame, a pair of tool beams associated therewith and connected thereto at the forward ends thereof, a gauge wheel associated with each tool beam, a crank axle on each beam to receive the gauge wheel associated therewith, each of said crank axles having a generally longitudinally extending crank portion on the end of which the associated gauge wheel is mounted, an adjusting lever for each of said tool beams, each lever having an arm fixed with respect thereto and link connected with the crank portion of the associated crank axle, seed selecting mechanism carried by said tool beams, and means for driving said seed selecting mechanism from one of said gauge wheels, said means including a transverse seed selecting shaft having a sprocket thereon, a double sprocket carried by said operating arm, a chain connecting said double sprocket and the sprocket on said seed selecting shaft, and a second chain connecting said double sprocket with said one gauge wheel.

29. In an agricultural implement, a wheeled supporting frame, a tool frame associated therewith and comprising a pair of generally longitudinally extending frame members having their forward ends disposed in converging relationship and their rear ends spaced apart and a transverse frame bar connected with said frame members and extending laterally thereof, tool means connected with said transverse bar, a gauge wheel associated with each of said frame members, a crank axle for each gauge wheel pivotally connected with the tool frame, and adjusting means for each gauge wheel including a rock shaft journaled on the associated frame member and having an operating arm disposed in substantially the same plane as and connected with the crank portion of the associated crank axle.

30. In an agricultural implement, a wheeled supporting frame, a tool frame associated therewith and comprising a pair of generally longitudinally extending frame members having their forward ends disposed in converging relationship and their rear ends spaced apart and a transverse frame bar connected with said frame members and extending laterally thereof, tool means connected with said transverse bar, a gauge wheel associated with each of said frame members, a crank axle for each gauge wheel pivotally connected with the tool frame, adjusting means for each gauge wheel including a rock shaft journaled on the associated frame member and having an operating arm disposed in substantially the same plane as and connected with the crank portion of the associated crank axle, seed selecting mechanism carried by said tool frame, and means for driving said seed selecting mechanism from one of said gauge wheels, said means including a transverse seed selecting shaft having a sprocket thereon, a double sprocket carried by said operating arm, a chain connecting said double sprocket and the sprocket on said seed selecting shaft, and a second chain connecting said double sprocket with said one gauge wheel.

31. In an agricultural implement, the combination of a tractor having rear traction wheels and associated drive housing means, a lister adapted to be connected therewith and including a tool frame associated therewith and comprising a pair of generally longitudinally extending members having their front ends converging forwardly and their rear portions disposed in substantially parallel relation and a transverse beam connected with said members adjacent the forward ends of said parallel portions, means rigidly fastening said forwardly converging ends together in closely spaced relation in the central vertical plane of the tractor forwardly of the axis of said rear traction wheels, stub beams disposed alongside said parallel portions and connected at their forward ends with said transverse member, a second transverse member connected with the rear ends of said longitudinal frame members and said stub beams, soil engaging tools carried by said stub beams, draft means including a member disposed between the closely spaced forwardly converging ends of the generally longitudinally extending members for pivotally connecting said tool frame with said tractor for limited lateral swinging movement, and means including a rock shaft mounted directly on said drive housing means and operatively connected with said tool frame so as to act through said first transverse beam in raising and lowering said tool frame, including the tool-carrying stub beams thereof, and accommodating the limited lateral swinging of the tool frame.

32. The combination with a tractor of a tool frame, means connecting the forward end of the tool frame with the tractor for vertical swinging, a ground working tool fixed to the rear end of the tool frame, a crank axle journaled on the tool frame adjacent the rear end thereof, a gauge wheel journaled on the cranked portion of the crank axle, means mounted on the tool frame for adjusting the crank axle relative thereto whereby the depth of operation of the ground working tool may be regulated, a seeding device including seed selecting mechanism supported on the tool frame, a driving connection from the gauge wheel to the seed selecting mechanism for operating the latter, a rock shaft on the tractor, means for rocking the rock shaft, and means for connecting the rock shaft with the tool frame for raising the ground working tool and the gauge wheel out of operating position.

33. In an agricultural implement, a wheeled supporting frame, a tool frame associated therewith and comprising a pair of generally longitudinally extending tool beams having their forward ends disposed in converging relationship and their rear ends spaced apart, means connecting the forward ends of said tool beams with said supporting frame so that the tool frame is capable of limited rocking movement relative thereto about a generally longitudinal axis, a transverse frame bar connected with said tool beams and extending laterally thereof, tool means connected with said transverse bar, a gauge wheel associated with each of said tool beams, a crank axle for each gauge wheel pivotally connected with the tool frame forward of said transverse frame bar, and adjusting means for each gauge wheel including a member rockably mounted on the associated tool beam rearwardly of said transverse frame bar and having an operating arm disposed in substantially the same plane as and connected with the associated crank axle.

34. In an agricultural implement, a wheeled supporting frame, a tool frame associated therewith and comprising a pair of generally longitudinally extending tool beams having their forward ends disposed in converging relationship and their rear ends spaced apart, means connecting the forward ends of said beams with said supporting frame so that the tool frame is capable of limited rocking movement relative thereto about a generally longitudinal axis, a transverse frame bar connected with said tool beams and extending laterally thereof, tool means connected with said transverse bar, a gauge wheel associated with each of said tool beams, a crank axle for each gauge wheel pivotally connected with the tool frame forward of said transverse frame bar, means serving as a bracket carried by each of said longitudinally extending tool frame beams rearwardly of said transverse frame bar, and adjusting means for each gauge wheel including a member rockably mounted on the associated bracket and link-connected with the associated crank axle.

35. In an agricultural implement, a wheeled supporting frame, a tool frame associated therewith and comprising a pair of generally longitudinally extending tool beams having their forward ends disposed in converging relationship and their rear ends spaced apart and a transverse frame bar connected with said tool beams and extending laterally thereof, tool means connected with said transverse bar, a laterally outwardly extending member rigidly secured to each of said tool beams, a pair of crank axles, one rockably mounted in each of said laterally outwardly extending members, a gauge wheel mounted on each of said crank axles, and adjusting means for each gauge wheel including a member rockably mounted on the associated tool beam rearwardly of said transverse bar and having an operating portion connected with the associated crank axle outwardly of the end of the associated laterally extending member.

36. In an agricultural implement, the combination of a tractor, a lister adapted to be connected therewith and including a tool frame associated therewith and comprising a pair of generally longitudinally extending tool beams and a transverse member connected with said tool beams, stub beams disposed alongside and laterally outwardly of the rear portions of said tool beams and connected at their forward ends with said transverse member, a second transverse member connected with the rear ends of said longitudinal tool beams and said stub beams, soil engaging tools carried by said stub beams, means connecting the forward ends of the generally longitudinally extending tool beams with the tractor for limited lateral tilting movement relatively thereto, means serving as a laterally extending bracket member rigidly connected with each of said generally longitudinally extending tool beams, a pair of crank axles for the tool frame, one crank axle being mounted in each of said rigid bracket means and disposed forwardly of said transverse members, and an adjusting mechanim for each of said crank axles including an adjusting lever associated with each crank axle and mounted for rocking movement in a position between said transverse members laterally outwardly of the associated longitudinally extending tool beam and laterally inwardly of the stub beam at that side of the implement.

37. An agricultural implement comprising a wheeled supporting frame, a tool frame associated therewith and including a pair of generally longitudinally extending members and a transverse member connected therewith and extending laterally outwardly thereof, a pair of stub beams having their forward ends secured to the laterally outer portions of said transverse member, soil engaging tools on said beams, seed selecting mechanisms carried by said tool frame above said stub beams, and means for driving at least one of said seed selecting mechanisms including a seed selecting shaft, a crank arm having a journal portion connected with the tool frame for rocking movement about a transverse axis, and a wheel receiving end, a ground engaging wheel carried by said wheel receiving end for vertical movement relative to said frame, and an articulated chain and sprocket connection between said wheel and said seed selecting shaft for driving the latter from said ground engaging wheel.

38. An agricultural implement comprising a wheeled supporting frame, a tool beam associated therewith and connected thereto at its forward end, a gauge wheel associated with said tool beam, a crank axle mounted for rocking movement on said beam to receive the gauge wheel associated therewith, said crank axle having a generally longitudinally extending axle portion on the end of which said gauge wheel is journaled, an adjusting lever rockably mounted on said tool beam and having a arm fixed with respect to the lever and link connected with the axle portion of said crank axle, seed selecting mechanism carried by said tool beam, and means for driving said seed selecting mechanism from the gauge wheel, said means including a generally transverse seed selecting shaft having a sprocket thereon, a double sprocket carried at the end of said operating arm, chain means connecting said double sprocket and the sprocket on said seed selecting shaft, and a sprocket chain connecting said double sprocket with said gauge wheel.

39. An agricultural implement comprising a wheeled supporting frame, a pair of tool beams associated therewith and connected thereto at the forward ends thereof, a gauge wheel associated with each tool beam, a crank axle on each beam to receive the gauge wheel associated therewith, each of said crank axles having a generally longitudinally extending crank portion on the end of which the associated gauge wheel is mounted, an adjusting lever for each of said tool beams, each lever having an arm fixed with respect thereto and link connected with the crank portion of the associated crank axle, seed selecting mechanism carried by said tool beams, and means for driving at least one of said seed selecting mechanisms from one of said gauge wheels, said means including a seed selecting shaft having a sprocket thereon, a double sprocket carried by said operating arm, sprocket chain means connecting said double sprocket and the sprocket on said seed selecting shaft, and a second chain connecting said double sprocket with said one gauge wheel.

40. An agricultural implement comprising a wheeled supporting frame, a tool frame associated therewith and including a pair of generally longitudinally extending members and a transverse member connected therewith and extending laterally outwardly thereof, a pair of stub beams having their forward ends secured to the laterally outer portions of said transverse member, soil engaging tools on said beams, seed selecting mechanisms carried by said tool frame above said stub beams, and means for driving at least one of said seed selecting mechanisms including a seed selecting shaft, a crank arm having a journal portion connected with the tool frame for rocking movement about a transverse axis and a wheel receiving end, a ground engaging wheel carried by said wheel receiving end for generally vertical movement relative to said frame, an articulated chain and sprocket connection between said wheel and said seed selecting shaft for driving the latter from said ground engaging wheel, and lever means pivotally connected with said tool frame and reacting against said crank arm for shifting the position of the latter relative to said frame.

41. An agricultural implement comprising a wheeled supporting frame, a tool frame associated therewith and including a pair of generally longitudinally extending members and a transverse member connected therewith and extending laterally outwardly thereof, a pair of stub beams having their forward ends secured to the laterally outer portions of said transverse member, soil engaging tools on said beams, seed selecting mechanisms carried by said tool frame, means for driving at least one of said seed selecting mechanisms including a seed selecting shaft journaled for rotation on said tool frame, a crank arm having a journal portion connected with the tool frame for rocking movement about a transverse axis and a wheel receiving end, a ground engaging wheel carried by said wheel receiving end for generally vertical movement relative to said frame, an articulated chain and sprocket connection between said wheel and said seed selecting shaft for driving the latter from said ground engaging wheel, means for raising said tool frame relative to said wheeled supporting frame, and means for causing said crank arm and ground engaging wheel to be raised when said tool frame is raised.

42. An agricultural implement comprising a wheeled supporting frame, a tool frame associated therewith and including a pair of generally longitudinally extending members and a transverse member connected therewith and extending laterally outwardly thereof, a pair of stub beams having their forward ends secured to the laterally outer portions of said transverse member, soil engaging tools on said beams, seed selecting mechanisms carried by said tool frame, means for driving at least one of said seed selecting mechanisms including a seed selecting shaft, a crank arm having a journal portion connected with the tool frame for rocking movement about a transverse axis and a wheel receiving end, a ground engaging wheel carried by said wheel receiving end for generally vertical movement relative to said frame, an articulated chain and sprocket connection between said wheel and said seed selecting shaft for driving the latter from said ground engaging wheel, means for raising said tool frame relative to said wheeled supporting frame, and lever means connected with one of said frames and adapted to react against said crank arm when the tool frame is raised to prevent the crank arm and ground engaging wheel from swinging downwardly relative to the tool frame when the latter is raised.

43. An agricultural implement comprising a wheeled supporting frame, a tool frame associated therewith and including a pair of generally longitudinally extending members and a transverse member connected therewith and extending laterally outwardly thereof, a draft connection connecting the forward end of said tool frame with said supporting frame for substantially vertical floating movement with respect thereto, a pair of stub beams having their forward ends secured to the laterally outer portions of said transverse member, soil engaging tools on said beams, seed selecting mechanisms carried by said tool frame above said stub beams, and means for driving at least one of said seed selecting mechanisms including a seed selecting shaft, a crank arm having a journal portion connected with the tool frame for rocking movement about a transverse axis and a wheel receiving end, a ground engaging wheel carried by said wheel receiving end for vertical movement relative to said frame, and an articulated chain and sprocket connection between said wheel and said seed selecting shaft for driving the latter from said ground engaging wheel while accommodating the movement of said tool frame relative to said supporting frame.

44. In an agricultural implement, a wheeled supporting frame, a tool frame associated therewith and comprising a pair of generally longitudinally extending tool beams having their forward ends disposed in converging relationship and their rear ends spaced apart and a transverse frame bar connected with said tool beams and extending laterally thereof, tool means connected with said transverse bar, a laterally outwardly extending sleeve member rigidly secured to each of said tool beams adjacent their forward ends, a pair of crank axles, one rockably mounted in each of said laterally outwardly extending sleeve members, a gauge wheel mounted on each of said crank axles and adjustable transversely of the supporting frame, and raising and lowering means for each gauge wheel including a member rockably mounted on the associated tool beam rearwardly of said transverse bar and having an operating portion connected with the associated crank axle outwardly of the end of the associated laterally extending member.

45. In an agricultural implement, in combination, a tractor, a tool supporting frame including a pair of beams extending forwardly beneath the tractor and converging at the forward ends thereof, and means disposed near the front of said tractor for pivotally supporting the converged forward ends of said beams on said tractor.

46. In an agricultural implement, in combination, a tractor having a pair of traction wheels, a ground-engaging tool-carrying frame including a pair of beams extending forwardly beneath the tractor, the forward ends of said beams being brought together to a single point of support, and means disposed forwardly of said traction wheels for pivotally supporting said forward ends of said beams on said tractor.

47. In an agricultural implement, in combination, a tractor having a pair of traction wheels and a body supported thereon, a longitudinally extending frame having a portion extending rearwardly from said tractor for supporting a ground-working tool rearwardly of said traction wheels, and a pair of beams extending under said tractor to points appreciably forwardly of said traction wheels, and means for supporting the forward ends of said beams on said body on a common pivot.

48. In combination with a tractor having a pair of traction wheels and a body supported thereon, a ground-working tool disposed rearwardly of said traction wheels, a supporting frame for said tool, supporting wheels for said frame disposed rearwardly of said tractor, said frame including a draft member extending forwardly beneath said tractor, and means for swingably connecting said draft member to said body at a point appreciably ahead of said traction wheels.

WALTER H. SILVER.